United States Patent
Abdul Jabbar et al.

(10) Patent No.: US 12,374,702 B2
(45) Date of Patent: Jul. 29, 2025

(54) BIPOLAR PLATE FOR FUEL CELL STACK

(71) Applicant: NISSAN NORTH AMERICA, INC., Franklin, TN (US)

(72) Inventors: Mohammed Hussain Abdul Jabbar, Novi, MI (US); Sandeep Patil, Farmington Hills, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 99 days.

(21) Appl. No.: 17/491,421

(22) Filed: Sep. 30, 2021

(65) Prior Publication Data
US 2023/0096327 A1   Mar. 30, 2023

(51) Int. Cl.
H01M 8/0245 (2016.01)
H01M 8/0232 (2016.01)
H01M 8/0236 (2016.01)
H01M 8/025 (2016.01)
H01M 8/0258 (2016.01)
(Continued)

(52) U.S. Cl.
CPC ....... *H01M 8/0245* (2013.01); *H01M 8/0232* (2013.01); *H01M 8/0236* (2013.01); *H01M 8/025* (2013.01); *H01M 8/0258* (2013.01); *H01M 8/1213* (2013.01); *H01M 2008/1293* (2013.01)

(58) Field of Classification Search
None
See application file for complete search history.

(56) References Cited

U.S. PATENT DOCUMENTS 6,291,094 B1 * 9/2001 Yoshimura .......... H01M 8/0228
429/492
7,833,667 B2   11/2010 Gerritse et al.
8,329,358 B2   12/2012 Peng et al.
(Continued)

FOREIGN PATENT DOCUMENTS

CN   103985886 A   8/2014
CN   112072134 A   12/2020

OTHER PUBLICATIONS

Lee et al, Electrochemical Properties of NiO-YSZ Thin Films on 316 Stainless Steel Bipolar Plates Under a Simulated PEMFC, Bull. Korean Chem. Soc. 2012, vol. 33, No. 4 1177-1182 (Year: 2012).*

*Primary Examiner* — Ula C Ruddock
*Assistant Examiner* — Mary Grace Byram
(74) *Attorney, Agent, or Firm* — Global IP Counselors, LLP

(57) ABSTRACT

A bipolar plate is provided that includes a metal plate, at least one channel, a first coating, and a second coating. The metal plate has a first surface, a second surface opposite the first surface, a first edge surface connecting the first surface to the second surface, and a second edge surface opposite the first edge surface and connecting the first surface to the second surface. The at least one channel is formed in at least one of the first surface and the second surface. The first coating is formed on the at least one of the first surface and the second surface such that the first coating covers each of the at least one channel. The second coating is formed on the first edge surface and the second edge surface. Each of the at least one channel has a semi-circular shape and extends along the at least one of the first surface and the second surface.

11 Claims, 4 Drawing Sheets

(51) Int. Cl.
   *H01M 8/1213*   (2016.01)
   *H01M 8/12*     (2016.01)

(56) References Cited

U.S. PATENT DOCUMENTS

| | | | |
|---|---|---|---|
| 2001/0033957 A1* | 10/2001 | Nakata | H01M 8/0206 429/514 |
| 2001/0049044 A1* | 12/2001 | Molter | H01M 8/026 429/434 |
| 2003/0022052 A1* | 1/2003 | Kearl | H01M 8/0228 216/17 |
| 2003/0190515 A1* | 10/2003 | Brady | C22C 19/05 429/533 |
| 2003/0198857 A1* | 10/2003 | McManus | H01M 8/0228 429/514 |
| 2004/0050713 A1* | 3/2004 | Chuang | H01M 8/04186 205/413 |
| 2004/0060967 A1* | 4/2004 | Yang | C04B 37/025 228/256 |
| 2004/0110058 A1* | 6/2004 | Lee | H01M 8/0228 429/522 |
| 2004/0202924 A1* | 10/2004 | Tao | H01M 4/9041 429/102 |
| 2005/0008904 A1* | 1/2005 | Suppes | H01M 8/0494 429/61 |
| 2005/0037212 A1* | 2/2005 | Budinski | H01M 8/0221 429/492 |
| 2005/0252892 A1* | 11/2005 | Newman | H01M 8/0223 219/121.64 |
| 2007/0166206 A1* | 7/2007 | Takahashi | B01J 19/2475 422/177 |
| 2009/0087716 A1* | 4/2009 | Abd Elhamid | C01G 27/02 423/608 |
| 2009/0092865 A1* | 4/2009 | Sekino | H01M 8/04171 429/413 |
| 2013/0230072 A1* | 9/2013 | Couse | H01M 8/04664 374/7 |
| 2014/0342267 A1* | 11/2014 | Parihar | H01M 8/0215 429/465 |
| 2016/0190604 A1 | 6/2016 | Evans et al. | |
| 2017/0237103 A1* | 8/2017 | Choi | H01M 4/8875 429/535 |
| 2021/0143448 A1* | 5/2021 | Blackburn | H01M 8/222 |

* cited by examiner

BIPOLAR PLATE FOR FUEL CELL STACK

BACKGROUND

Field of the Invention

The present invention generally relates to a bipolar plate for a solid oxide fuel cell stack that includes fuel cells with a metal-supported anode, and a fuel cell stack including the bipolar plate. The bipolar plate includes a metal plate, at least one channel for gas flow, a first coating, and a second coating. The metal plate has a first surface, a second surface opposite the first surface, a first edge surface, and a second edge surface. The at least one channel is formed in at least one of the first surface and the second surface. The first coating covers each of the at least one channel, and the second coating is formed on the first and second edge surfaces. Each of the at least one channel has a semi-circular shape and extends along the at least one of the first surface and the second surface.

Background Information

Solid oxide fuel cells ("SOFC") are desirable because they have combined high heat and power efficiency, generate low emissions and have a relatively low cost. However, SOFCs require a high operating temperature in order for oxygen ions to conduct, so they undesirably require longer start-up times and have mechanical and chemical compatibility issues. Furthermore, conventional SOFCs are very heavy due to conventional thick ceramic anode supports and therefore cannot be used in applications such as drones and electric vehicles. Conventional SOFCs are also made of ceramics, so they are brittle and could break when a drone lands or during harsh driving conditions.

In order to improve the strength of SOFCs, metal-supported SOFCs have been provided in which the anode of the fuel cell is supported by a metal substrate. However, conventional metal-supported SOFC stacks are very heavy due to the thickness required for the metal substrate. Furthermore, for applications in which multiple fuel cells are needed to generate a high amount of power, a metal bipolar plate is needed to ensure that adjacent fuel cells are not connected when stacking the fuel cells, and the thickness required for the multiple bipolar plates undesirably increase the overall thickness of the fuel cell stack. Thus, such fuel cell stacks cannot be used in applications such as drones or electric vehicles ("EV") where very thin cells are required to achieve high volumetric power density. Conventional metal-supported SOFCs also have sealing issues due to the use of adhesives for stacking of the electrolyte and the anode on metal bipolar plates.

Therefore, further improvement is needed to reduce the thickness of metal-supported SOFC stacks while maintaining sufficient strength and eliminating sealing issues. In particular, it is desirable to reduce the thickness of the bipolar plates without adversely affecting the strength or other properties of the metal-supported SOFC stack.

SUMMARY

It has been discovered that the thickness of the bipolar plates in the metal-supported SOFC stack can be reduced by providing a bipolar plate in which the gas flow channels formed on the surface of the bipolar plate have a semi-circular shape. The semi-circular shape can provide an increased surface area for gas to contact an anode of the fuel cell as compared with gas flow channels having a square shape with distinct edges. A non-metal oxide coating is formed on the surface of the bipolar plate such that the non-metal oxide coating covers the semi-circular gas flow channels. Furthermore, an insulating coating is formed on the edges of the bipolar plate to insulate and seal the bipolar plate when it is stacked in the fuel cell stack.

In particular, it has been discovered that a bipolar plate, in which a semi-circular gas flow channel is provided on a surface of the metal substrate, a non-metal oxide coating is formed to cover the semi-circular gas flow channel and an insulating coating is provided on the edges of the bipolar plate, can be incorporated into a metal-supported SOFC stack to reduce the overall thickness of the fuel cell stack while still maintaining sufficient strength. Therefore, it is desirable to provide a fuel cell stack that includes such a bipolar plate.

In view of the state of the known technology, one aspect of the present disclosure is to provide a bipolar plate comprising: a metal plate, at least one channel, a first coating and a second coating. The metal plate has a first surface, a second surface opposite the first surface, a first edge surface connecting the first surface to the second surface, and a second edge surface opposite the first edge surface and connecting the first surface to the second surface. The at least one channel is formed in at least one of the first surface and the second surface. The first coating is formed on the at least one of the first surface and the second surface such that the first coating covers each of the at least one channel, and the second coating is formed on the first edge surface and the second edge surface. Each of the at least one channel has a semi-circular shape and extends along the at least one of the first surface and the second surface.

Another aspect of the present disclosure is to provide a fuel cell stack including a first fuel cell, a second fuel cell, and a bipolar plate. The first fuel cell includes a first cathode, a first electrolyte comprising a first solid oxide ceramic material, and a first anode. The first anode includes a first metal substrate having at least one hole formed therein, and a first anode material formed on a surface of the first metal substrate and within each of the at least one hole. The second fuel cell includes a second cathode, a second electrolyte comprising a second solid oxide ceramic material, and a second anode. The second anode includes a second metal substrate having at least one hole formed therein, and a second anode material formed on a surface of the second metal substrate and within each of the at least one hole. The bipolar plate is formed between the first anode of the first fuel cell and the second anode of the second fuel cell, and the bipolar plate includes a metal plate, at least one channel, a first coating, and a second coating. The metal plate has a first surface facing the first anode, a second surface opposite the first surface and facing the second anode, a first edge surface connecting the first surface to the second surface, and a second edge surface opposite the first edge surface and connecting the first surface to the second surface. The at least one channel is formed in the first surface and the second surface. The first coating is formed on the first surface and the second surface such that the first coating covers each of the at least one channel, and the second coating formed on the first edge surface and the second edge surface. Each of the at least one channel has a semi-circular shape and extends along the at least one of the first surface and the second surface.

By forming the at least one channel to have a semi-circular shape, the surface area for the gas to contact the anode or the cathode can be increased, thereby improving the gas distribution in the fuel cells. Furthermore, by providing the first coating on the at least one semi-circular channel, chromium oxide and rust formation can be prevented on the cathode side of the fuel cells. In addition, the second coating on the edges of the bipolar plate helps seal the fuel cell stack and prevent gas from undesirably leaking out of the fuel cell.

Furthermore, conventional metal-supported SOFC stacks include square channels for gas flow on the bipolar plate. In contrast, by providing the at least one gas flow channel having a semi-circular shape with no defined edges, the surface area for the gas to contact the anode or cathode can be increased as compared with conventional gas flow channels, thereby improving the gas flow distribution in the fuel cell stack and the overall performance of the fuel cell stack.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
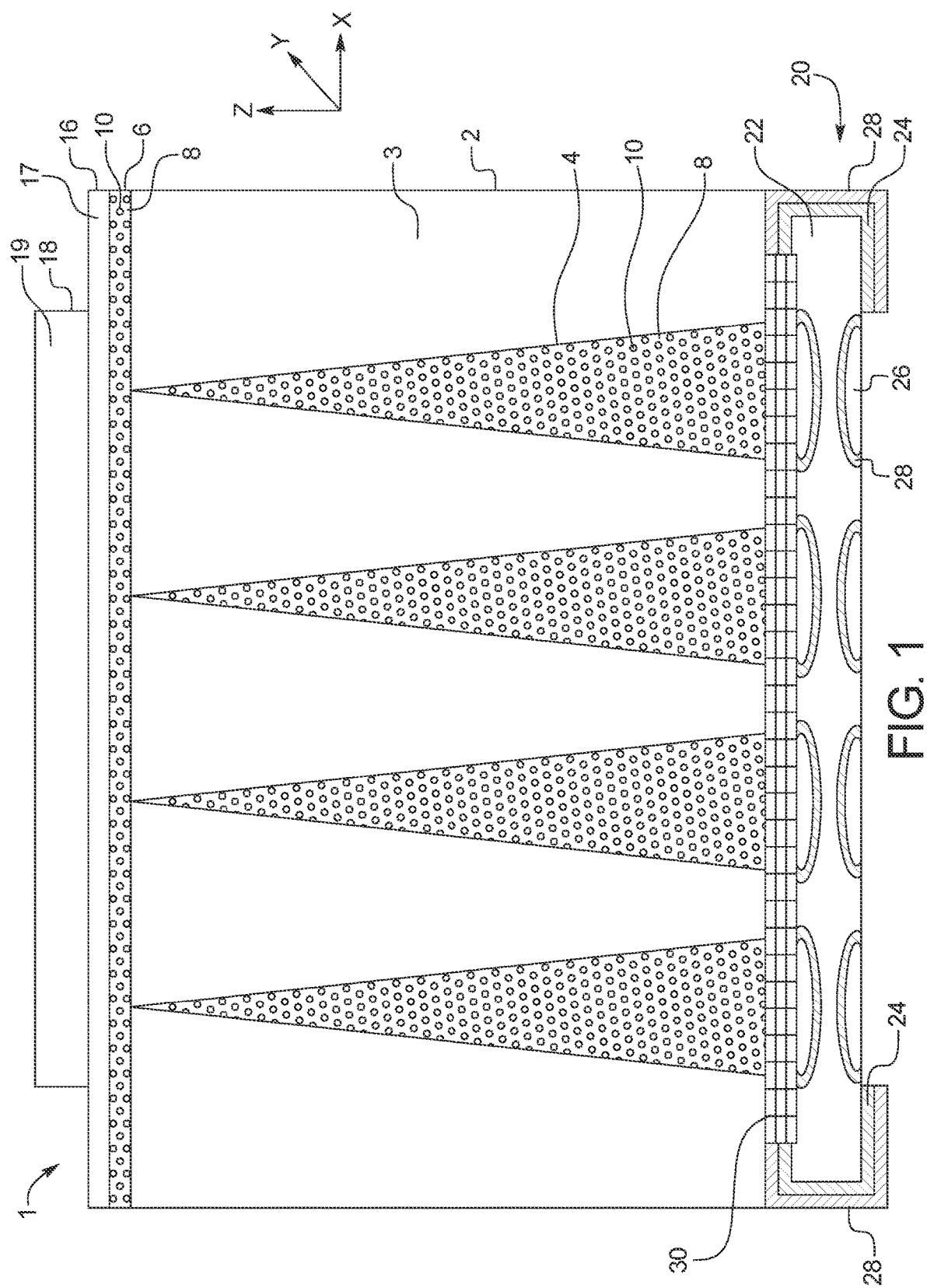
FIG. 1 is a cross-sectional view of a solid oxide fuel cell and a bipolar plate according to one embodiment.

Referring initially to FIG. 1, a single solid oxide fuel cell 1 and a bipolar plate 20 are illustrated in accordance with a first embodiment. The solid oxide fuel cell 1 includes a metal substrate 2, an anode 6, an electrolyte 16 and a cathode 18. The solid oxide fuel cell 1 and the bipolar plate 20 can be incorporated in a metal-supported SOFC fuel cell stack and used in a drone, an electric vehicle, a combined heat-generating and power-generating device, or any other suitable mobile device.

The metal substrate 2 is formed of a metal 3 and has a plurality of holes 4 formed in the metal 3. The metal 3 is preferably any suitable metal for use in a metal-supported SOFC. For example, the metal 3 may be stainless steel such as SS type 440. The metal 3 has a porosity of approximately 30-50%. The metal 3 has a thickness of approximately 250-600 μm, preferably no greater than 350 μm. For example, the metal 3 has a thickness of 300 μm in the Z-direction and a width of 30 mm in the X-direction.

As shown in FIG. 1, each of the plurality of holes has a different size at one surface of the metal substrate 2 than at the opposite surface of the metal substrate 2. For example, the plurality of holes 4 each has a diameter of approximately 40-60 μm at the bottom surface of the metal substrate 2 and a diameter of approximately 5-20 μm at the top surface of the metal substrate 2 that is in contact with the anode 6.

The plurality of holes 4 in the metal substrate 2 may be formed by laser drilling holes in the metal 3. The holes 4 are not formed at the edge of the metal substrate 2 and instead are formed at a distance of 2-5 mm from the edges of the metal substrate 2 in the X-direction as shown in FIG. 1. Preferably, the holes 4 do not make up more than 30-50% of the surface area of the metal substrate 2. As shown in FIG. 1, the holes 4 each have a V-shape in which the diameter of the hole is different at one surface of the metal substrate 2 than at the opposite surface. However, it should be understood that the holes 4 may have any suitable shape. For example, the holes 4 may have a same diameter of approximately 5-60 μm throughout the metal substrate 2 such that the diameter of the holes 4 is the same at opposite surfaces of the metal substrate 2. Furthermore, although the holes 4 in FIG. 1 each have a uniform shape and size, it should be understood that the plurality of holes 4 in the metal substrate 2 may have varying shapes and sizes. Preferably, the diameter of the holes 4 is greater at the bottom surface of the metal substrate 2 than at the top surface of the metal substrate 2 that is closer to the electrolyte 16 than the bottom surface.

The anode 6 is formed of a porous anode material 8 having a plurality of pores 10 formed therein. The anode 6 is preferably formed via electrophoretic deposition (EPD) of the porous anode material 8 on the metal substrate 2 in the Z-direction. The anode 6 has a thickness of approximately 2.5-15 μm, preferably 7-15 μm in the Z-direction.

As shown in FIG. 1, the porous anode material 8 is formed on the top surface of the metal substrate 2 and within the holes 4 in the metal substrate 2. The porous anode material 8 has a porosity of approximately 30-50%. The porous anode material 8 includes a metal oxide and a solid oxide ceramic material. For example, the metal oxide may be nickel oxide (NiO), and the solid oxide ceramic material may be scandia ceria stabilized zirconia (ScCeSZ). The porous anode material 8 includes approximately 40-60% by volume of NiO and approximately 40-60% by volume of ScCeSZ. The porous anode material 8 preferably includes 50% by volume of NiO and 50% by volume of ScCeSZ. However, the porous anode material 8 may also include additives such as tin (Sn). It should be understood that the ScCeSZ material also includes gadolinium (Gd) as a dopant for the ceria (CeO) in the ScCeSZ material. The pores 10 each have a size or diameter of approximately 1-5 μm.

The electrolyte 16 is a solid oxide electrolyte that includes a solid oxide ceramic material 17. The electrolyte 16 has a thickness of approximately 5-15 μm in the Z-direction. For example, the electrolyte 16 has a thickness of 10 μm or less. The electrolyte 16 may be formed via EPD of the solid oxide ceramic material 17 on the top surface of the anode 6. By forming the electrolyte 16 via EPD, the electrolyte 16 can desirably be formed to have a small thickness.

The solid oxide ceramic material 17 can be any suitable solid oxide ceramic material. For example, the solid oxide ceramic material 17 can be dense and preferably has a porosity of 1% or less. By providing a solid oxide ceramic material 17 that is dense, the electrolyte 16 may be stacked more easily without using adhesives, thereby eliminating the undesirable sealing issues with conventional metal-supported SOFCs. For example, the solid oxide ceramic material 17 may be ScCeSZ. The solid oxide ceramic material 17 preferably has the same composition as the solid oxide material included in the anode material 8.

The cathode 18 includes a cathode material 19. The cathode 18 has a thickness of 20-30 μm in the Z-direction. The cathode 18 may be formed via EPD of the cathode material 19 on the top surface of the electrolyte 16. As with the electrolyte 16, by forming the cathode 18 via EPD, the cathode 18 can desirably be formed to have a small thickness.

The cathode material 19 can be any suitable cathode material for a SOFC. The cathode material 19 is a low temperature material that sinters at a temperature of 850° C. or less. For example, the cathode material 19 may be samarium strontium cobalt oxide (SSC), having the formula $SrSmCoO_3$, PrBaSrCoFeO, or any suitable perovskite oxide having the general formula $ABO_3$. The cathode material 19 is porous and has a porosity of 30-60%.

The bipolar plate 20 includes a metal plate 22, a first coating 24, a plurality of semi-circular channels 26 formed on the top and bottom surfaces of the metal plate 22, and a second coating 28. The metal plate 22 can be any suitable metal for a bipolar plate. For example, the metal plate can be formed of a stainless steel material, such as SS 330, SS 441 or Crofer 22, preferably SS 441. A total width of the bipolar plate 20 in the X-direction, including the first coating 24 and the second coating 28, ranges from 10 cm to 50 cm, and is preferably 20 cm. The total width of the bipolar plate 20 is approximately the same as the width of the metal substrate 2. The thickness of the bipolar plate 20 in the Z-direction ranges from 500 µm to 800 µm, and a length of the bipolar plate 20 in the Y-direction ranges from 10 cm to 50 cm, preferably 40 cm.

The metal plate 22 is covered by a first coating 24. The first coating 24 is a non-metal oxide coating, preferably manganese cobalt oxide. The non-metal oxide coating can be any suitable anti-corrosive coating that prevents the formation of chromium oxide (CrO) and rust on the air or cathode side of the fuel cell 1. For example, the first coating 24 can include at least one Cu—Mn based spinel, such as $CuNi_{0.2}Mn_{1.8}O_4$, or at least one Mn—Co based spinel, such as $MnCo_2O_4$.

As shown in FIG. 1, the first coating 24 covers a part of the top surface of the metal plate 22, the entire bottom surface of the metal plate 22 including the semi-circular channels 26, and both edges or side surfaces of the metal plate 22. The first coating 24 is dense and has a thickness of approximately 1 µm to 10 µm. However, it should be understood that the first coating 24 can cover the entire metal plate 22 or can cover only the semi-circular channels 26, as long as the first coating 24 covers at least the entirety of the semi-circular channels 26.

Alternatively, the first coating 24 can be a bi-layer coating including a bottom layer closer to the surface of the metal plate 22 that includes the non-metal oxide coating, and a top or outer layer that includes a reforming catalyst. The reforming catalyst includes a high entropy alloy or a mixture of high entropy alloys. For example, the reforming catalyst includes at least one of a Ni—Cu—Co—Fe—Mn—O-doped ceria composite, a Ru—Ce—Zr alloy, a Ni—Fe-ceria alloy, a nickel metal oxide alloy, Ni—$CeO_2$, Ni—$CeO_2$ (doped with Gd, Sm), Ni—$PrO_x$, Pd—$CeO_2$, Ni—Fe—$CeO_2$, and combinations of noble metal and Ni with $CeO_2$ and/or Ce—Zr-transition metal composites. The reforming catalyst layer has a thickness of approximately 20 µm to 50 µm, and the non-metal oxide layer has a thickness of approximately 1 µm to 10 µm. By providing the reforming catalyst layer on the metal plate 22, the compatibility of the solid oxide fuel cell 1 with various types of fuels can be improved. For example, by changing the reforming catalyst that is coated on the metal plate 22, the types of fuels used with the solid oxide fuel cell 1 can also advantageously be changed.

The semi-circular channels 26 are formed as cavities in the top and bottom surfaces of the metal plate 22. As shown in FIG. 1, the semi-circular channels 26 have a rounded shape with no defined edge, in contrast to the square gas flow channels formed in conventional bipolar plates. The semi-circular channels 26 each have a width or diameter of approximately 10 µm to 500 µm, preferably 100 µm to 250 µm, in the X-direction. The semi-circular channels 26 each have a height of approximately 10 µm to 500 µm, preferably 100 µm to 250 µm, in the Z-direction. The semi-circular channels 26 are spaced apart on the top and bottom surfaces of the metal plate 22 at regular intervals of approximately 10 µm to 500 µm, preferably 100 µm to 250 µm, between each of the semi-circular channels 26. However, it should be understood that the semi-circular channels 26 can include only one channel or can be formed at irregular intervals along the top and bottom surfaces of the metal plate 22. It should also be understood that the semi-circular channels 26 can be formed to extend in the X-direction and be spaced apart from each other at intervals in the Y-direction.

The second coating 28 is an insulating material that seals the metal plate 22. The second coating 28 preferably includes a yttria stabilized zirconia (YSZ) ceramic. The second coating 28 can also contain glass to prevent fusion at low temperatures of less than 700° C. Any suitable insulating material may be used as the second coating 28, as long as the insulating material can be coated on the metal plate 22 at a temperature of less than 700° C. For example, the second coating 28 can include at least one of: silicate glass, a silicate/glass-ceramic, a Ba—Al—B—La silicate/glass-ceramic, and a Sr—Ca—B—Zn—Ti silicate glass-ceramic. The second coating 28 has a thickness of approximately 10 µm to 20 µm.

As shown in FIG. 1, a metal mesh 30 is provided between the bipolar plate 20 and the solid oxide fuel cell 1. The metal mesh 30 is formed of a suitable metal for making contact between the metal substrate 2 and the bipolar plate 20. For example, the metal mesh 30 is preferably formed of nickel or copper. The metal mesh 30 has a grid-like pattern with square- or rectangular-shaped holes between portions of the metal. The metal mesh 30 has a thickness in the Z-direction of approximately 30-50 µm. The metal mesh 30 has a length in the Y-direction and a width in the X-direction that are less than the length and width of the bipolar plate 20, respectively, and the mesh 30 fits within the portions of the second coating 28 and the first coating 24 provided on the top surface of the bipolar plate 20.

Figure 2:
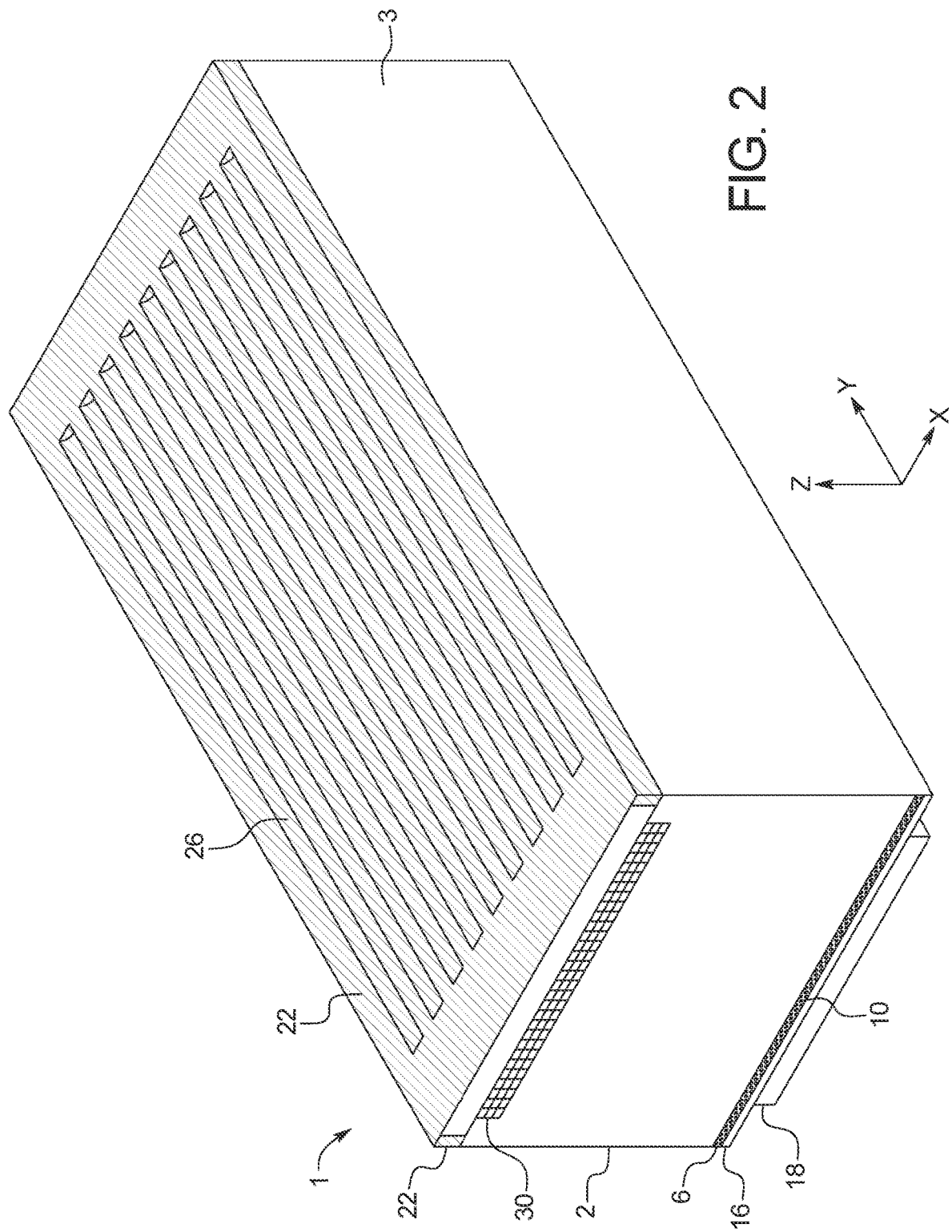
FIG. 2 is a perspective view of the solid oxide fuel cell and bipolar plate of FIG. 1.

FIG. 2 shows a perspective view of the solid oxide fuel cell 1 and bipolar plate 20 of the first embodiment. As shown in FIG. 2, the semi-circular channels 26 extend along the top and bottom surfaces of the bipolar plate 20 in the Y-direction. The length of the semi-circular channels 26 in the Y-direction ranges from approximately 10 cm to 30 cm and is preferably 20 cm. However, the semi-circular channels 26 do not extend along the entire length of the bipolar plate 20 in the Y-direction. As shown in FIGS. 1 and 2, the bipolar plate 20, including the first coating 24 and the second coating 28, has a total width in the X-direction that is approximately the same as the width of the metal substrate 2.

Figure 3:
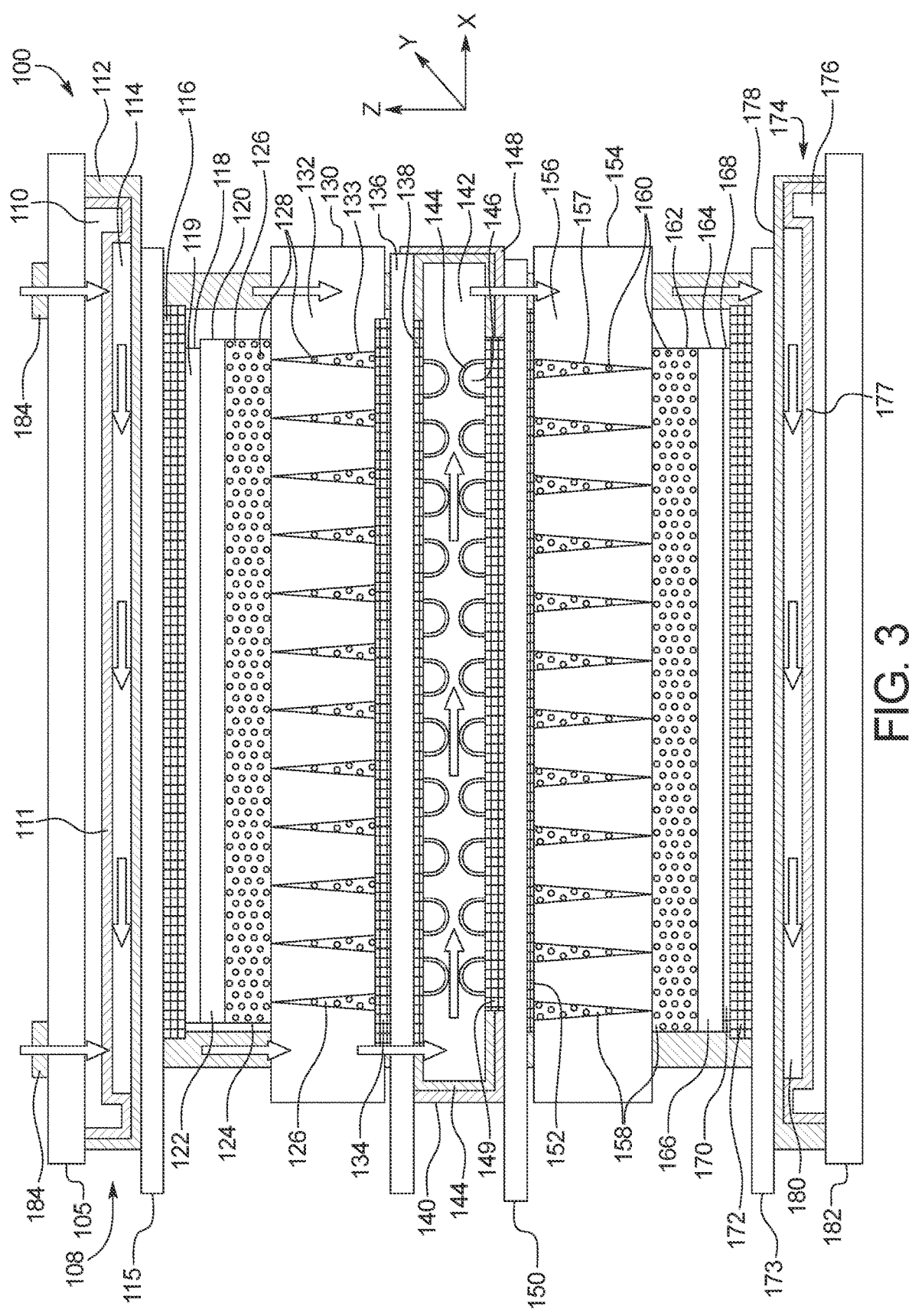
FIG. 3 is a cross-sectional view of a fuel cell stack including a bipolar plate according to an embodiment.

FIG. 3 shows a solid oxide fuel cell stack 100 in accordance with a second embodiment. The solid oxide fuel cell stack 100 includes two alternately disposed fuel cells that are stacked so as to face each other and form a single repeating unit. As with the solid oxide fuel cell 1 in the first embodiment, the solid oxide fuel cell stack 100 can be incorporated in a drone, an electric vehicle, a combined heat-generating and power-generating device, or any other suitable mobile device.

The fuel cell stack 100 includes a top end plate 105 that acts as a current collector. The top end plate 105 is a metal plate formed of, for example, stainless steel, preferably a SS 440 series metal. The top end plate 105 has a width in the X-direction that is greater than the width of an air side bipolar plate 108. For example, the width of the top end plate 105 in the X-direction ranges from 10 cm to 30 cm. The top end plate 105 has a length in the Y-direction of 10 cm to 60 cm and a thickness in the Z-direction ranging from 0.3 cm to 1 cm.

The top end plate 105 is coated with a sealant. The sealant is an insulating material for sealing the fuel cell stack 100 and preferably includes a YSZ ceramic material. The sealant can also contain glass to prevent fusion at low temperatures of less than 700° C. However, it should be understood that any suitable insulating material may be used as the sealant, as long as the insulating material can be coated on the metal top end plate 105 at a temperature of less than 700° C. For example, the sealant can include at least one of: silicate glass, a silicate/glass-ceramic, a Ba—Al—B—La silicate/glass-ceramic, and a Sr—Ca—B—Zn—Ti silicate glass-ceramic. The sealant has a thickness of approximately 10 μm to 20 μm.

The fuel cell stack 100 also includes a bipolar plate 108. The bipolar plate 108 includes a metal plate 110, a first coating 111, a second coating 112, and a plurality of semi-circular channels 114 formed on the bottom surface of the metal plate 110. Although not shown in the cross-sectional view, the plurality of semi-circular channels 114 extend along the bottom surface of the metal plate 110 in the X-direction such that air flows in the X-direction along the semi-circular channels 114. However, as shown in FIG. 3, the semi-circular channels 114 do not extend along the entire width of the metal plate 110 in the X-direction. The metal plate 110 can be any suitable metal for a bipolar plate. For example, the metal plate can be formed of a stainless steel material, such as SS 330, SS 441 or Crofer 22, preferably SS 441. A total width of the bipolar plate 108 in the X-direction, including the first coating 111 and the second coating 112, ranges from 10 cm to 50 cm, and is preferably 20 cm. The thickness of the bipolar plate 108 in the Z-direction ranges from 500 μm to 800 μm, and a length of the bipolar plate 108 in the Y-direction ranges from 10 cm to 50 cm, preferably 40 cm.

The metal plate 110 is covered by a first coating 111. The first coating 111 is a non-metal oxide coating, preferably manganese cobalt oxide. The non-metal oxide coating can be any suitable anti-corrosive coating that prevents the formation of chromium oxide (CrO) and rust on the air or cathode side of the fuel cells in the solid oxide fuel cell stack 100. For example, the first coating 111 can include at least one Cu—Mn based spinel, such as $CuNi_{0.2}Mn_{1.8}O_4$, or at least one Mn—Co based spinel, such as $MnCo_2O_4$.

As shown in FIG. 3, the first coating 111 covers a part of the top surface of the metal plate 110, a part of the bottom surface of the metal plate 110 including the semi-circular channels 114, and both edges or side surfaces of the metal plate 110. The first coating 111 is dense and has a thickness of approximately 1 μm to 10 μm. However, it should be understood that the first coating 111 can cover the entire metal plate 110 or can cover only the semi-circular channels 114, as long as the first coating 111 covers at least the entirety of the semi-circular channels 114.

Alternatively, the first coating 111 can be a bi-layer coating including a bottom layer closer to the surface of the metal plate 110 that includes the non-metal oxide coating, and a top or outer layer that includes a reforming catalyst. The reforming catalyst includes a high entropy alloy or a mixture of high entropy alloys. For example, the reforming catalyst includes at least one of a Ni—Cu—Co—Fe—Mn—O-doped ceria composite, a Ru—Ce—Zr alloy, a Ni—Fe-ceria alloy, a nickel metal oxide alloy, Ni—$CeO_2$, Ni—$CeO_2$ (doped with Gd, Sm), Ni-PrOx, Pd—$CeO_2$, Ni—Fe—$CeO_2$, and combinations of noble metal and Ni with $CeO_2$ and/or Ce—Zr-transition metal composites. The reforming catalyst layer has a thickness of approximately 20 μm to 50 μm, and the non-metal oxide layer has a thickness of approximately 1 μm to 10 μm. By providing the reforming catalyst layer on the metal plate 110, the compatibility of the solid oxide fuel cell stack 100 with various types of fuels can be improved. For example, by changing the reforming catalyst, the types of fuels used with the solid oxide fuel cell stack 100 can also advantageously be changed.

The semi-circular channels 114 are formed as cavities in the bottom surface of the metal plate 110. The semi-circular channels 114 each have a width or diameter of approximately 10 μm to 500 μm, preferably 100 μm to 250 μm, in the Y-direction. The semi-circular channels 114 each have a height of approximately 10 μm to 500 μm, preferably 100 μm to 250 μm, in the Z-direction.

The semi-circular channels 114 are spaced apart on the bottom surface of the metal plate 110 at regular intervals of approximately 10 μm to 500 μm, preferably 100 μm to 250 μm, between each of the semi-circular channels 114 in the Y-direction. However, it should be understood that the semi-circular channels 114 can include only one channel or can be formed at irregular intervals along the bottom surface of the metal plate 110 in the Y-direction. As shown in FIG. 3, air flows along the semi-circular channels 114 in the X-direction.

The second coating 112 is an insulating material that seals the metal plate 110. The second coating 112 preferably includes a YSZ ceramic. The second coating 112 can also contain glass to prevent fusion at low temperatures of less than 700° C. Any suitable insulating material may be used as the second coating 112, as long as the insulating material can be coated on the metal plate 110 at a temperature of less than 700° C. For example, the second coating 112 can include at least one of: silicate glass, a silicate/glass-ceramic, a Ba—Al—B—La silicate/glass-ceramic, and a Sr—Ca—B—Zn—Ti silicate glass-ceramic. The second coating 112 has a thickness of approximately 10 μm to 20 μm.

The solid oxide fuel cell stack 100 also includes a positive electrode terminal 115. As shown in FIG. 3, the positive electrode terminal 115 is in contact with the second coating 112 on the bipolar plate 108. The positive electrode terminal 115 is formed of any suitable metal. For example, the positive electrode terminal 115 can be formed of copper or a stainless steel material such as Crofer. The positive electrode terminal 115 has a frame-like shape with a rectangular-shaped hole formed in the center thereof to allow air to flow from the semi-circular channels 114 to a cathode 118 of a first fuel cell. The positive electrode terminal 115 has a lead that protrudes outside of the cell stack with a width in the X-direction of approximately 1 cm to 2 cm. The positive electrode terminal 115 has a length in the Y-direction of approximately 3 cm to 15 cm and a thickness in the Z-direction of approximately 0.01 cm to 0.3 cm. It should be understood that the positive electrode terminal 115 has any suitable shape and dimensions such that air can flow from the semi-circular channels 114 to the cathode 118.

The solid oxide fuel cell stack 100 includes a mesh current collector 116 in contact with both the positive electrode terminal 114 and the cathode 118 of the first fuel cell. The first fuel cell includes the cathode 118, an electrolyte 120, an anode 124 and a metal substrate 130. The mesh current collector 116 is formed of a suitable metal for making electrical contact between the positive electrode terminal 114 and the cathode 118. For example, the mesh current collector 116 is preferably formed of nickel or copper. The mesh current collector 116 has a grid-like pattern with square- or rectangular-shaped holes between portions of the metal. The mesh current collector 116 has a thickness in the Z-direction of approximately 30-50 μm. The mesh current collector 116 has a length in the Y-direction and a width in the X-direction that are less than the length and width of the positive electrode terminal 114, respectively.

The cathode 118 is the same as the cathode 18 of the first embodiment and includes a cathode material 119. The cathode 118 has a thickness of 20-30 μm in the Z-direction. The cathode 118 may be formed via EPD of the cathode material 119 on the top surface of the electrolyte 120. By forming the cathode 118 via EPD, the cathode 118 can desirably be formed to have a small thickness.

The cathode material 119 can be any suitable cathode material for a SOFC. The cathode material 119 is a porous low temperature material that sinters at a temperature of 850° C. or less. For example, the cathode material 119 may be SSC having the formula $SrSmCoO_3$, $PrBaSrCoFeO$, or any suitable perovskite oxide having the general formula $ABO_3$. The cathode material 119 has a porosity of 30-60%.

The electrolyte 120 is the same as the electrolyte 16 of the first embodiment and includes a solid oxide ceramic material 122. The electrolyte 120 has a thickness of approximately 5-15 μm in the Z-direction. For example, the electrolyte 120 has a thickness of 10 μm or less. The electrolyte 120 may be formed via EPD of the solid oxide ceramic material 122 on the top surface of the anode 124. By forming the electrolyte 120 via EPD, the electrolyte 120 can desirably be formed to have a small thickness.

The solid oxide ceramic material 122 can be any suitable solid oxide ceramic material, for example ScCeSZ. The solid oxide ceramic material 122 is dense and preferably has a porosity of 1% or less. By providing a solid oxide ceramic material 122 that is dense, the electrolyte 120 may be stacked more easily without using adhesives, thereby eliminating the undesirable sealing issues with conventional metal-supported SOFCs.

The anode 124 is the same as the anode 6 of the first embodiment and is formed of a porous anode material 126 having a plurality of pores 128 formed therein. The anode 124 is preferably formed via EPD of the porous anode material 126 on the metal substrate 130 in the Z-direction. The anode 124 has a thickness of approximately 2.5-15 μm, preferably 7-15 μm in the Z-direction.

As shown in FIG. 3, the porous anode material 126 is formed on the top surface of the metal substrate 130 and within holes 133 in the metal substrate 130. The porous anode material 126 has a porosity of approximately 30-50%. The porous anode material 126 includes a metal oxide and a solid oxide ceramic material. The solid oxide ceramic material included in the porous anode material 126 preferably has the same composition as the solid oxide ceramic material 122.

For example, the metal oxide may be NiO, and the solid oxide ceramic material may be ScCeSZ. The porous anode material 126 includes approximately 40-60% by volume of NiO and approximately 40-60% by volume of ScCeSZ. The porous anode material 126 preferably includes 50% by volume of NiO and 50% by volume of ScCeSZ. However, the porous anode material 126 may optionally include additives such as tin (Sn). It should be understood that the ScCeSZ material also includes gadolinium (Gd) as a dopant for the ceria (CeO) in the ScCeSZ material. The pores 128 have a size or diameter of approximately 1-5 μm.

The metal substrate 130 is formed of a metal 132 and has a plurality of holes 133 formed therein. The metal 132 is preferably any suitable metal for use in a metal-supported SOFC. For example, the metal may be stainless steel such as SS type 440. The metal 132 has a porosity of approximately 30-50%. The metal 132 has a thickness of approximately 250-600 μm, preferably no greater than 350 μm. For example, the metal 132 has a thickness of 300 μm in the Z-direction and a width of 30 mm in the X-direction.

As shown in FIG. 3, the plurality of holes 133 each has a different size at one surface of the metal substrate 130 than at the opposite surface of the metal substrate 130. For example, the plurality of holes 133 each has a diameter of approximately 40-60 μm at the bottom surface of the metal substrate 130 and a diameter of approximately 5-20 μm at the top surface of the metal substrate 130 that is in contact with the anode 124.

The plurality of holes 133 in the metal substrate 130 may be formed by laser drilling holes in the metal 132. The holes 133 are not formed at the edge of the metal substrate 130 and instead are formed at a distance of 2-5 mm from the edges of the metal substrate 130 in the X-direction as shown in FIG. 3. Preferably, the holes 133 do not make up more than 30-50% of the surface area of the metal substrate 130. As shown in FIG. 3, the holes 133 each have a V-shape in which the diameter of the hole is different at one surface of the metal substrate 130 than at the opposite surface. However, it should be understood that the holes 133 may have any suitable shape. For example, the holes 133 may have a same diameter of approximately 5-60 μm throughout the metal substrate 130 such that the diameter of the holes 133 is the same at opposite surfaces of the metal substrate 130. Furthermore, although the holes 133 in FIG. 3 each have a uniform shape and size, it should be understood that the plurality of holes 133 in the metal substrate 130 may have varying shapes and sizes. Preferably, the diameter of the holes 133 is greater at the bottom surface of the metal substrate 130 than at the top surface of the metal substrate 130 that is closer to the electrolyte 120 than the bottom surface.

The solid oxide fuel cell stack 100 includes a metal mesh 134 provided between the metal substrate 130 and a negative electrode terminal 136. The metal mesh 134 is in contact with both the metal substrate 130 of the first fuel cell and the negative electrode terminal 136. The metal mesh 134 is formed of a suitable metal for making electrical contact between the metal substrate 130 and the negative electrode terminal 136. For example, the metal mesh 134 is preferably formed of nickel or copper. The metal mesh 134 has a grid-like pattern with square- or rectangular-shaped holes between portions of the metal. The metal mesh 134 has a thickness in the Z-direction of approximately 30-50 μm. The metal mesh 134 has a length in the Y-direction and a width in the X-direction that are less than the length and width of the metal substrate 130, respectively.

The solid oxide fuel cell stack 100 also includes the negative electrode terminal 136. As shown in FIG. 3, the negative electrode terminal 136 is in contact with both the metal mesh 134 and a metal mesh 138. The negative electrode terminal 136 is formed of any suitable metal, such as copper or a stainless steel material, for example Crofer. The negative electrode terminal 136 has a frame-like shape with a rectangular-shaped hole formed in the center thereof to allow fuel to flow from semi-circular channels 146 on the top surface of a metal plate 142 to the holes 133 in the metal substrate 130 of the first fuel cell. The negative electrode terminal 136 has a lead that protrudes from the cell stack with a width in the X-direction of approximately 1 cm to 2 cm. The negative electrode terminal 136 has a length in the Y-direction of approximately 3 cm to 15 cm and a thickness in the Z-direction of approximately 0.01 cm to 0.3 cm. It should be understood that the negative electrode terminal 136 has any suitable shape and dimensions such that fuel can flow from the semi-circular channels 146 on the top surface of the metal plate 142 to the holes 133 in the metal substrate 130.

The metal mesh 138 of the solid oxide fuel cell stack 100 is provided between the negative electrode terminal 136 and a fuel flow bipolar plate 140. The metal mesh 138 is in contact with both the negative electrode terminal 136 and the bipolar plate 140. The metal mesh 138 is formed of a suitable metal for making electrical contact between the negative electrode terminal 136 and the bipolar plate 140. For example, the metal mesh 138 is preferably formed of nickel or copper. The metal mesh 138 has a grid-like pattern with square- or rectangular-shaped holes between portions of the metal. The metal mesh 138 has a thickness in the Z-direction of approximately 30-50 µm. The metal mesh 138 has a length in the Y-direction and a width in the X-direction that are less than the length and width of the bipolar plate 140, respectively, and the mesh 138 fits within the portion of the first coating 144 provided on the top surface of the bipolar plate 140.

The bipolar plate 140 includes a metal plate 142, a first coating 144, a plurality of semi-circular channels 146 formed on the top and bottom surfaces of the metal plate 142, and a second coating 148. The metal plate 142 can be any suitable metal for a bipolar plate. For example, the metal plate can be formed of a stainless steel material, such as SS 330, SS 441 or Crofer 22, preferably SS 441. A total width of the bipolar plate 140 in the X-direction, including the first coating 144 and the second coating 148, ranges from 10 cm to 50 cm, and is preferably 20 cm. The thickness of the bipolar plate 140 in the Z-direction ranges from 500 µm to 800 µm, and a length of the bipolar plate 140 in the Y-direction ranges from 10 cm to 50 cm, preferably 40 cm.

The metal plate 142 is covered by a first coating 144. The first coating 144 is a non-metal oxide coating, preferably manganese cobalt oxide. The non-metal oxide coating can be any suitable anti-corrosive coating that prevents the formation of chromium oxide (CrO) and rust on the air or cathode side of the fuel cells in the solid oxide fuel cell stack 100. For example, the first coating 144 can include at least one Cu—Mn based spinel, such as $CuNi_{0.2}Mn_{1.8}O_4$, or at least one Mn—Co based spinel, such as $MnCo_2O_4$.

As shown in FIG. 3, the first coating 144 covers a part of the top surface of the metal plate 142, a part of the bottom surface of the metal plate 142 including the semi-circular channels 146, and both edges or side surfaces of the metal plate 142. The first coating 144 is dense and has a thickness of approximately 1 µm to 10 µm. However, it should be understood that the first coating 144 can cover the entire metal plate 142 or can cover only the semi-circular channels 146, as long as the first coating 144 covers at least the entirety of the semi-circular channels 146.

Alternatively, the first coating 144 can be a bi-layer coating including a bottom layer closer to the surface of the metal plate 142 that includes the non-metal oxide coating, and a top or outer layer that includes a reforming catalyst. The reforming catalyst includes a high entropy alloy or a mixture of high entropy alloys. For example, the reforming catalyst includes at least one of a Ni—Cu—Co—Fe—Mn—O-doped ceria composite, a Ru—Ce—Zr alloy, a Ni—Fe-ceria alloy, a nickel metal oxide alloy, Ni—$CeO_2$, Ni—$CeO_2$ (doped with Gd, Sm), Ni-PrOx, Pd—$CeO_2$, Ni—Fe—$CeO_2$, and combinations of noble metal and Ni with $CeO_2$ and/or Ce—Zr-transition metal composites. The reforming catalyst layer has a thickness of approximately 20 µm to 50 µm, and the non-metal oxide layer has a thickness of approximately 1 µm to 10 µm. By providing the reforming catalyst layer on the metal plate 142, the compatibility of the solid oxide fuel cell stack 100 with various types of fuels can be improved. For example, by changing the reforming catalyst, the types of fuels used with the solid oxide fuel cell stack 100 can also advantageously be changed.

The semi-circular channels 146 are formed as cavities in the both the top and bottom surfaces of the metal plate 142. As shown in FIG. 3, the semi-circular channels 146 have a rounded shape with no defined edge. The semi-circular channels 146 each have a width or diameter of approximately 10 µm to 500 µm, preferably 100 µm to 250 µm, in the X-direction. The semi-circular channels 146 each have a height of approximately 10 µm to 500 µm, preferably 100 µm to 250 µm, in the Z-direction. The semi-circular channels 146 are spaced apart on the top and bottom surfaces of the metal plate 142 at regular intervals of approximately 10 µm to 500 µm, preferably 100 µm to 250 µm, between each of the semi-circular channels 146. However, it should be understood that the semi-circular channels 146 can include only one channel or can be formed at irregular intervals along the top and bottom surfaces of the metal plate 142. As shown in FIG. 3, fuel flows along the semi-circular channels 146 in the Y-direction.

The second coating 148 is an insulating material that seals the metal plate 142. The second coating 148 preferably includes a YSZ ceramic. The second coating 148 can also contain glass to prevent fusion at low temperatures of less than 700° C. Any suitable insulating material may be used as the second coating 148, as long as the insulating material can be coated on the metal plate 142 at a temperature of less than 700° C. For example, the second coating 148 can include at least one of: silicate glass, a silicate/glass-ceramic, a Ba—Al—B—La silicate/glass-ceramic, and a Sr—Ca—B—Zn—Ti silicate glass-ceramic. The second coating 148 has a thickness of approximately 10 µm to 20 µm.

The solid oxide fuel cell stack 100 includes a metal mesh 149 provided between the bipolar plate 140 and a negative electrode terminal 150. The metal mesh 149 is in contact with both the bipolar plate 140 and the negative electrode terminal 150. The metal mesh 149 is formed of a suitable metal for making electrical contact between the bipolar plate 140 and the negative electrode terminal 150. For example, the metal mesh 149 is preferably formed of nickel or copper. The metal mesh 149 has a grid-like pattern with square- or rectangular-shaped holes between portions of the metal. The metal mesh 149 has a thickness in the Z-direction of approximately 30-50 µm. The metal mesh 149 has a length in the Y-direction and a width in the X-direction that are less than the length and width of the bipolar plate 140, respectively, and the mesh 149 fits within the portions of the second coating 148 and the first coating 144 provided on the top surface of the bipolar plate 140.

The solid oxide fuel cell stack 100 also includes the negative electrode terminal 150 and a metal mesh 152. As shown in FIG. 3, the negative electrode terminal 150 is in contact with both the metal mesh 149 and the metal mesh 152. The negative electrode terminal 150 is formed of any suitable metal, such as copper or a stainless steel material, for example Crofer. The negative electrode terminal 150 has a frame-like shape with a rectangular-shaped hole formed in the center thereof to allow fuel to flow from the semi-circular channels 146 on the bottom surface of the metal plate 142 to holes 157 in the metal substrate 154 of the second fuel cell. The negative electrode terminal 150 has a lead that protrudes from the cell stack with a width in the X-direction of approximately 1 cm to 2 cm. The negative electrode terminal 150 has a length in the Y-direction of approximately 3 cm to 15 cm and a thickness in the Z-direction of approximately 0.01 cm to 0.3 cm. It should be understood that the negative electrode terminal 150 has any suitable shape and dimensions such that fuel can flow from the semi-circular channels 146 on the bottom surface of the metal plate 142 to the holes 157 in the metal substrate 154.

The metal mesh 152 is provided between the negative electrode terminal 150 and a metal substrate 154 of a second fuel cell. The second fuel cell includes the metal substrate 154, an anode 162, an electrolyte 164, and a cathode 168.

The metal mesh 152 is in contact with both the negative electrode terminal 150 and the metal substrate 154. The metal mesh 152 is formed of a suitable metal for making electrical contact between the negative electrode terminal 150 and the metal substrate 154. For example, the metal mesh 152 is preferably formed of nickel or copper. The metal mesh 152 has a grid-like pattern with square- or rectangular-shaped holes between portions of the metal. The metal mesh 152 has a thickness in the Z-direction of approximately 30-50 μm. The metal mesh 152 has a length in the Y-direction and a width in the X-direction that are less than the length and width of the metal substrate 154, respectively.

As with the metal substrate 130 of the first fuel cell, the metal substrate 154 of the second fuel cell is formed of a metal 156 and has a plurality of holes 157 formed therein. A porous anode material 158 having a plurality of pores 160 is formed on the bottom surface of the metal substrate 154 and within holes 157 in the metal substrate 154.

The metal 156 is preferably any suitable metal for use in a metal-supported SOFC. For example, the metal may be stainless steel such as SS type 440. The metal 156 has a porosity of approximately 30-50%. The metal 156 has a thickness of approximately 250-600 μm, preferably no greater than 350 μm. For example, the metal 156 has a thickness of 300 μm in the Z-direction and a width of 30 mm in the X-direction.

The plurality of holes 157 each has a different size at one surface of the metal substrate 154 than at the opposite surface of the metal substrate 154. For example, the plurality of holes 157 each has a diameter of approximately 40-60 μm at the top surface of the metal substrate 154 and a diameter of approximately 5-20 μm at the bottom surface of the metal substrate 154 that is in contact with the anode 162.

The plurality of holes 157 in the metal substrate 154 may be formed by laser drilling holes in the metal 156. The holes 157 are not formed at the edge of the metal substrate 154 and instead are formed at a distance of 2-5 mm from the edges of the metal substrate 154 in the X-direction as shown in FIG. 3. Preferably, the holes 157 do not make up more than 30-50% of the surface area of the metal substrate 154. The holes 157 each have a V-shape in which the diameter of the hole is different at one surface of the metal substrate 154 than at the opposite surface. However, it should be understood that the holes 157 may have any suitable shape. For example, the holes 157 may have a same diameter of approximately 5-60 μm throughout the metal substrate 154 such that the diameter of the holes 157 is the same at opposite surfaces of the metal substrate 154. Furthermore, although the holes 157 in FIG. 3 each have a uniform shape and size, it should be understood that the plurality of holes 157 in the metal substrate 154 may have varying shapes and sizes. Preferably, the diameter of the holes 157 is greater at the top surface of the metal substrate 154 than at the bottom surface of the metal substrate 154 that is closer to the electrolyte 164 than the bottom surface.

The porous anode material 158 has a porosity of approximately 30-50%. The porous anode material 158 includes a metal oxide and a solid oxide ceramic material. For example, the metal oxide may be NiO, and the solid oxide ceramic material may be ScCeSZ. The porous anode material 158 includes approximately 40-60% by volume of NiO and approximately 40-60% by volume of ScCeSZ. The porous anode material 158 preferably includes 50% by volume of NiO and 50% by volume of ScCeSZ. However, the porous anode material 158 may optionally include additives such as tin. It should be understood that the ScCeSZ material also includes Gd as a dopant for the CeO in the ScCeSZ material. The pores 160 have a size or diameter of approximately 1-5 μm.

The anode 162 of the second fuel cell is formed of the porous anode material 158 having a plurality of pores 160 formed therein. The anode 162 is preferably formed via EPD of the porous anode material 158 on the metal substrate 154 in the Z-direction. The anode 162 has a thickness of approximately 2.5-15 μm, preferably 7-15 μm in the Z-direction.

The electrolyte 164 is a solid oxide electrolyte that includes a solid oxide ceramic material 166. The electrolyte 164 has a thickness of approximately 5-15 μm in the Z-direction. For example, the electrolyte 164 has a thickness of 10 μm or less. The electrolyte 164 may be formed via EPD of the solid oxide ceramic material 166 on the surface of the anode 162. By forming the electrolyte 164 via EPD, the electrolyte 164 can desirably be formed to have a small thickness.

The solid oxide ceramic material 166 can be any suitable solid oxide ceramic material. For example, the solid oxide ceramic material 166 can be dense and preferably has a porosity of 1% or less. By providing a solid oxide ceramic material 166 that is dense, the electrolyte 164 may be stacked more easily without using adhesives, thereby eliminating the undesirable sealing issues with conventional metal-supported SOFCs. For example, the solid oxide ceramic material 166 may be ScCeSZ. The solid oxide ceramic material 166 preferably has the same composition as the solid oxide material included in the anode material 158.

The cathode 168 includes a cathode material 170. The cathode 168 has a thickness of 20-30 μm in the Z-direction. The cathode 168 may be formed via EPD of the cathode material 170 on the surface of the electrolyte 164. As with the electrolyte 164, by forming the cathode 168 via EPD, the cathode 168 can desirably be formed to have a small thickness.

The cathode material 170 can be any suitable cathode material for a SOFC. The cathode material 170 is a porous low temperature material that sinters at a temperature of 850° C. or less. For example, the cathode material 170 may be SSC having the formula $SrSmCoO_3$, PrBaSrCoFeO, or any suitable perovskite oxide having the general formula $ABO_3$. The cathode material 170 has a porosity of 30-60%.

The solid oxide fuel cell stack 100 includes a mesh current collector 172 in contact with both the cathode 168 of the second fuel cell and a positive electrode terminal 173. The mesh current collector 172 is formed of a suitable metal for making electrical contact between the cathode 168 and the positive electrode terminal 173. For example, the mesh current collector 172 is preferably formed of nickel or copper. The mesh current collector 172 has a grid-like pattern with square- or rectangular-shaped holes between portions of the metal. The mesh current collector 172 has a thickness in the Z-direction of approximately 30-50 μm. The mesh current collector 172 has a length in the Y-direction and a width in the X-direction that are less than the length and width of a positive electrode terminal 173, respectively.

The positive electrode terminal 173 is formed of any suitable metal. For example, the positive electrode terminal 173 can be formed of copper or a stainless steel material such as Crofer. The positive electrode terminal 173 has a frame-like shape with a rectangular-shaped hole formed in the center thereof to allow air to flow from semi-circular channels 180 on the top surface of a metal plate 176 to the cathode 168 of the second fuel cell. The positive electrode terminal 173 has a lead that protrudes from the cell stack with a width in the X-direction of approximately 1 cm to 2 cm. The positive electrode terminal 173 has a length in the Y-direction of approximately 3 cm to 15 cm and a thickness in the Z-direction of approximately 0.01 cm to 0.3 cm. It should be understood that the positive electrode terminal 173 has any suitable shape and dimensions such that air can flow from the semi-circular channels 180 to the cathode 168.

The fuel cell stack 100 also includes a bipolar plate 174. The bipolar plate 174 includes a metal plate 176, a first coating 177, a second coating 178, and the plurality of semi-circular channels 180 formed on the top surface of the metal plate 176. Although not shown in the cross-sectional view, the plurality of semi-circular channels 180 extend along the bottom surface of the metal plate 176 in the X-direction such that air flows in the X-direction along the semi-circular channels 178. However, as shown in FIG. 3, the semi-circular channels 180 do not extend along the entire width of the metal plate 176 in the X-direction. The metal plate 176 can be any suitable metal for a bipolar plate. For example, the metal plate can be formed of a stainless steel material, such as SS 330, SS 441 or Crofer 22, preferably SS 441. A total width of the bipolar plate 174 in the X-direction, including the first coating 177 and the second coating 178, ranges from 10 cm to 50 cm, and is preferably 20 cm. The thickness of the bipolar plate 174 in the Z-direction ranges from 500 μm to 800 μm, and a length of the bipolar plate 174 in the Y-direction ranges from 10 cm to 50 cm, preferably 40 cm.

The metal plate 176 is covered by a first coating 177. The first coating 177 is a non-metal oxide coating, preferably manganese cobalt oxide. The non-metal oxide coating can be any suitable anti-corrosive coating that prevents the formation of chromium oxide (CrO) and rust on the air or cathode side of the fuel cells in the solid oxide fuel cell stack 100. For example, the first coating 177 can include at least one Cu—Mn based spinel, such as $CuNi_{0.2}Mn_{1.8}O_4$, or at least one Mn—Co based spinel, such as $MnCo_2O_4$.

As shown in FIG. 3, the first coating 177 covers a part of the bottom surface of the metal plate 176, a part of the top surface of the metal plate 176 including the semi-circular channels 180, and both edges or side surfaces of the metal plate 176. The first coating 177 is dense and has a thickness of approximately 1 μm to 10 μm. However, it should be understood that the first coating 177 can cover the entire metal plate 176 or can cover only the semi-circular channels 180, as long as the first coating 177 covers at least the entirety of the semi-circular channels 180.

Alternatively, the first coating 177 can be a bi-layer coating including a bottom layer closer to the surface of the metal plate 176 that includes the non-metal oxide coating, and a top or outer layer that includes a reforming catalyst. The reforming catalyst includes a high entropy alloy or a mixture of high entropy alloys. For example, the reforming catalyst includes at least one of a Ni—Cu—Co—Fe—Mn—O-doped ceria composite, a Ru—Ce—Zr alloy, a Ni—Fe-ceria alloy, a nickel metal oxide alloy, Ni—$CeO_2$, Ni—$CeO_2$ (doped with Gd, Sm), Ni-PrOx, Pd—$CeO_2$, Ni—Fe—$CeO_2$, and combinations of noble metal and Ni with $CeO_2$ and/or Ce—Zr-transition metal composites. The reforming catalyst layer has a thickness of approximately 20 μm to 50 μm, and the non-metal oxide layer has a thickness of approximately 1 μm to 10 μm. By providing the reforming catalyst layer on the metal plate 176, the compatibility of the solid oxide fuel cell stack 100 with various types of fuels can be improved. For example, by changing the reforming catalyst, the types of fuels used with the solid oxide fuel cell stack 100 can also advantageously be changed.

The semi-circular channels 180 are formed as cavities in the bottom surface of the metal plate 176. The semi-circular channels 180 each have a width or diameter of approximately 10 μm to 500 μm, preferably 100 μm to 250 μm, in the Y-direction. The semi-circular channels 180 each have a height of approximately 10 μm to 500 μm, preferably 100 μm to 250 μm, in the Z-direction.

The semi-circular channels 180 are spaced apart on the top surface of the metal plate 176 at regular intervals of approximately 10 μm to 500 μm, preferably 100 μm to 250 μm, between each of the semi-circular channels 180 in the Y-direction. However, it should be understood that the semi-circular channels 180 can include only one channel or can be formed at irregular intervals along the bottom surface of the metal plate 176 in the Y-direction. As shown in FIG. 3, air flows along the semi-circular channels 180 in the X-direction.

The second coating 178 is an insulating material that seals the metal plate 176. The second coating 178 preferably includes a YSZ ceramic. The second coating 178 can also contain glass to prevent fusion at low temperatures of less than 700° C. Any suitable insulating material may be used as the second coating 178, as long as the insulating material can be coated on the metal plate 176 at a temperature of less than 700° C. For example, the second coating 178 can include at least one of: silicate glass, a silicate/glass-ceramic, a Ba—Al—B—La silicate/glass-ceramic, and a Sr—Ca—B—Zn—Ti silicate glass-ceramic. The second coating 178 has a thickness of approximately 10 μm to 20 μm.

The bottom end plate 182 of the fuel cell stack 100 acts as a current collector. The bottom end plate 182 is a metal plate formed of, for example, stainless steel, preferably a SS 440 series metal. The bottom end plate 182 has a width in the X-direction that is greater than the width of the bipolar plate 174. For example, the width of the bottom end plate 182 in the X-direction ranges from 10 cm to 30 cm. The bottom end plate 182 has a length in the Y-direction of 10 cm to 60 cm and a thickness in the Z-direction ranging from 0.3 cm to 1 cm.

The bottom end plate 182 is coated with a sealant. The sealant is an insulating material for sealing the fuel cell stack 100 and preferably includes a YSZ ceramic material. The sealant can also contain glass to prevent fusion at low temperatures of less than 700° C. The sealant may be the same material as the second coating 112, the second coating 148 or the second coating 178 and is any suitable insulating material.

However, it should be understood that any suitable insulating material may be used as the sealant, as long as the insulating material can be coated on the metal bottom end plate 182 at a temperature of less than 700° C. For example, the sealant can include at least one of: silicate glass, a silicate/glass-ceramic, a Ba—Al—B—La silicate/glass-ceramic, and a Sr—Ca—B—Zn—Ti silicate glass-ceramic. The sealant has a thickness of approximately 10 µm to 20 µm.

The fuel cell stack also includes hollow screws 184 that are coated with an insulating material. The insulating material for screws 184 may be the same material as the second coating 112, the second coating 148 or the second coating 178 and is any suitable insulating material. For example, the insulating material for the screws 184 can include at least one of: silicate glass, a silicate/glass-ceramic, a Ba—Al—B—La silicate/glass-ceramic, and a Sr—Ca—B—Zn—Ti silicate glass-ceramic. The hollow screws 184 have a length ranging from 10 cm to 24 cm and a diameter of approximately 0.8 cm. The head of each of the screws 184 has a diameter of 1.2 cm. Furthermore, the hollow screws have a hollow central axis forming a gas flow channel with a diameter of approximately 500 µm to 10 mm, preferably 1 mm to 5 mm.

Although FIG. 3 shows a configuration in which two air side bipolar plates 108 and 174 are each provided at opposite ends of the cell stack for air to flow to a cathode of a fuel cell, and a single bipolar plate 140 is provided in the center of the cell stack for fuel to flow to anodes that face each other, it should be understood that the fuel cell stack 100 may be configured to flip the first and second fuel cells such that the anodes are closest to the end plates. In such a configuration, the positive electrode terminals 115 and 173 would be replaced with negative electrode terminals, the air side bipolar plates 108 and 174 would be replaced with fuel side bipolar plates that each allow fuel to flow to an anode of a fuel cell, and bipolar plate 140 would be replaced with an air side bipolar plate that allows air to flow to cathodes that face each other.

It should also be understood that any suitable cathode gas may be used instead of air. Furthermore, it should be understood that, although the semi-circular channels 114 and 178 extend along the X-direction and the semi-circular channels 146 extend along the Y-direction, the semi-circular channels 114 and 178 can be configured to extend along the Y-direction and the semi-circular channels 146 can be configured to extend along the X-direction, as long as the semi-circular channels 114 and 178 extend in the same direction and such direction is transverse to the direction in which the semi-circular channels 146 extend.

Figure 4:
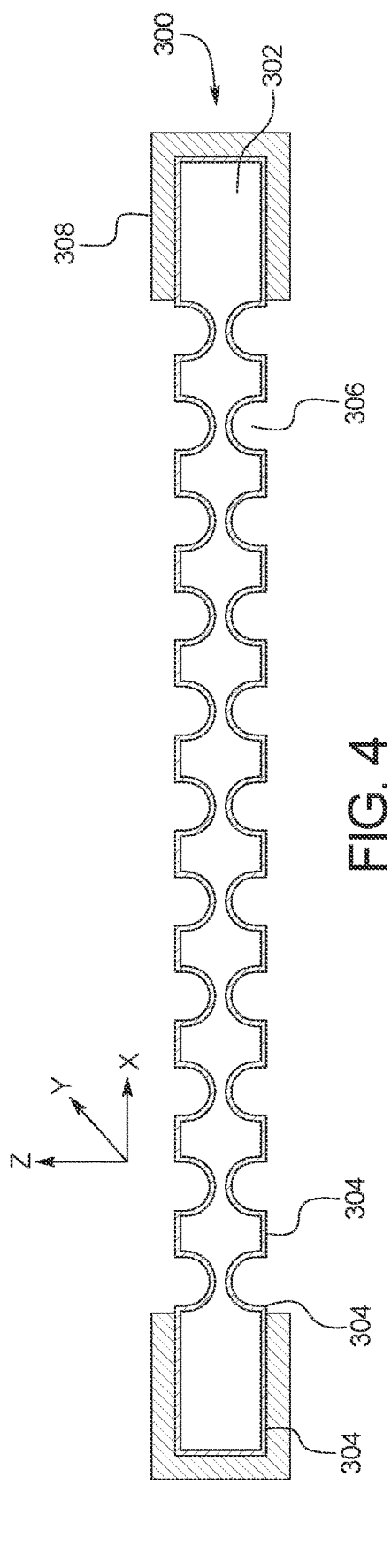
FIG. 4 is a cross-sectional view of a bipolar plate according to one embodiment.

FIG. 4 shows a bipolar plate 300 in accordance with a third embodiment. As shown in FIG. 4, the bipolar plate 300 includes a metal plate 302, a first coating 304, a plurality of semi-circular channels 306 formed on the top and bottom surfaces of the metal plate 302, and a second coating 308. The metal plate 302 can be any suitable metal for a bipolar plate. For example, the metal plate can be formed of a stainless steel material, such as SS 330, SS 441 or Crofer 22, preferably SS 441. A total width of the bipolar plate 300 in the X-direction, including the first coating 304 and the second coating 308, ranges from 10 cm to 50 cm, and is preferably 20 cm. The thickness of the bipolar plate 300 in the Z-direction ranges from 500 µm to 800 µm, and a length of the bipolar plate 300 in the Y-direction ranges from 10 cm to 50 cm, preferably 40 cm.

The metal plate 302 is covered by a first coating 304. The first coating 304 is a non-metal oxide coating, preferably manganese cobalt oxide. The non-metal oxide coating can be any suitable anti-corrosive coating that prevents the formation of chromium oxide (CrO) and rust on the air or cathode side of the fuel cells in a solid oxide fuel cell stack. For example, the first coating 304 can include at least one Cu—Mn based spinel, such as $CuNi_{0.2}Mn_{1.8}O_4$, or at least one Mn—Co based spinel, such as $MnCo_2O_4$.

As shown in FIG. 4, the first coating 304 covers the entirety of the metal plate 302, including the top surface of the metal plate 302, the bottom surface of the metal plate 302 including the semi-circular channels 306, and both edges or side surfaces of the metal plate 302. The first coating 304 is dense and has a thickness of approximately 1 µm to 10 µm. However, it should be understood that the first coating 304 can cover only a portion of the metal plate 302, as long as the first coating 304 covers at least the entirety of the semi-circular channels 306.

The semi-circular channels 306 are formed as cavities in the both the top and bottom surfaces of the metal plate 302. As shown in FIG. 4, the semi-circular channels 306 have a rounded shape with no defined edge. The semi-circular channels 306 each have a width or diameter of approximately 10 µm to 500 µm, preferably 100 µm to 250 µm, in the X-direction. The semi-circular channels 306 each have a height of approximately 10 µm to 500 µm, preferably 100 µm to 250 µm, in the Z-direction. The semi-circular channels 306 are spaced apart on the top and bottom surfaces of the metal plate 302 at regular intervals of approximately 10 µm to 500 µm, preferably 100 µm to 250 µm, between each of the semi-circular channels 306. However, it should be understood that the semi-circular channels 306 can include only one channel or can be formed at irregular intervals along the top and bottom surfaces of the metal plate 302. It should also be understood that the semi-circular channels 306 can be formed to extend in the X-direction and be spaced apart from each other at intervals in the Y-direction.

The second coating 308 is an insulating material that seals the metal plate 302. The second coating 308 preferably includes a YSZ ceramic. The second coating 308 can also contain glass to prevent fusion at low temperatures of less than 700° C. Any suitable insulating material may be used as the second coating 308, as long as the insulating material can be coated on the metal plate 302 at a temperature of less than 700° C. For example, the second coating 308 can include at least one of: silicate glass, a silicate/glass-ceramic, a Ba—Al—B—La silicate/glass-ceramic, and a Sr—Ca—B—Zn—Ti silicate glass-ceramic. The second coating 308 has a thickness of approximately 10 µm to 20 µm.

Figure 5:
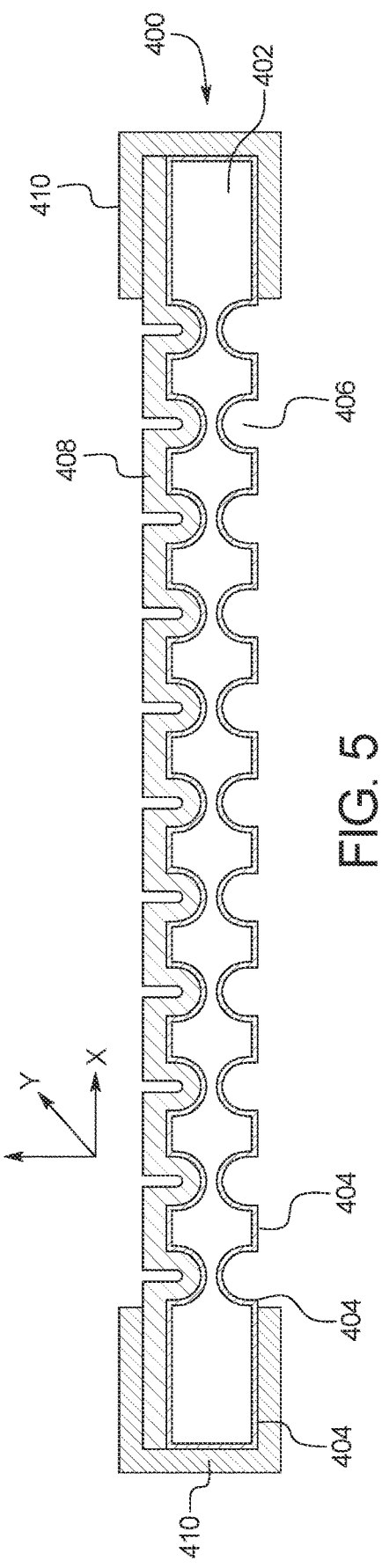
FIG. 5 is a cross-sectional view of a bipolar plate according to an embodiment.

FIG. 5 shows a bipolar plate 400 in accordance with a fourth embodiment. The bipolar plate 400 includes a metal plate 402, a first coating 404, a plurality of semi-circular channels 406 formed on the top and bottom surfaces of the metal plate 402, a second coating 408 formed on only the portion of the first coating 404 that covers the top surface of the metal plate 402, and a third coating 410.

The metal plate 402 can be any suitable metal for a bipolar plate. For example, the metal plate can be formed of a stainless steel material, such as SS 330, SS 441 or Crofer 22, preferably SS 441. A total width of the bipolar plate 400 in the X-direction, including the first coating 404, the second coating 408, and the third coating 410, ranges from 10 cm to 50 cm, and is preferably 20 cm. The thickness of the bipolar plate 400 in the Z-direction ranges from 500 μm to 800 μm, and a length of the bipolar plate 400 in the Y-direction ranges from 10 cm to 50 cm, preferably 40 cm.

The metal plate 402 is covered by a first coating 404. The first coating 404 is a non-metal oxide coating, preferably manganese cobalt oxide. The non-metal oxide coating can be any suitable anti-corrosive coating that prevents the formation of CrO and rust on the air or cathode side of the fuel cells in a solid oxide fuel cell stack. For example, the first coating 404 can include at least one Cu—Mn based spinel, such as $CuNi_{0.2}Mn_{1.8}O_4$, or at least one Mn—Co based spinel, such as $MnCo_2O_4$.

As shown in FIG. 5, the first coating 404 covers the entirety of the metal plate 402, including the top surface of the metal plate 402, the bottom surface of the metal plate 402 including the semi-circular channels 406, and both edges or side surfaces of the metal plate 402. However, it should be understood that the first coating 404 can cover only a portion of the metal plate 402, as long as the first coating 404 covers at least the entirety of the semi-circular channels 406. The first coating 404 is dense and has a thickness of approximately 1 μm to 10 μm.

The semi-circular channels 406 are formed as cavities in the both the top and bottom surfaces of the metal plate 402. The semi-circular channels 406 have a rounded shape with no defined edge as shown in FIG. 5. The semi-circular channels 406 each have a width or diameter of approximately 10 μm to 500 μm, preferably 100 μm to 250 μm, in the X-direction and a height of approximately 10 μm to 500 μm, preferably 100 μm to 250 μm, in the Z-direction. The semi-circular channels 406 are spaced apart on the top and bottom surfaces of the metal plate 402 at regular intervals of approximately 10 μm to 500 μm, preferably 100 μm to 250 μm, between each of the semi-circular channels 406. However, it should be understood that the semi-circular channels 406 can include only one channel or can be formed at irregular intervals along the top and bottom surfaces of the metal plate 402. It should also be understood that the semi-circular channels 406 can be formed to extend in the X-direction and be spaced apart from each other at intervals in the Y-direction.

The second coating 408 includes a reforming catalyst and is formed on only one surface of the metal plate 402. The reforming catalyst includes a high entropy alloy or a mixture of high entropy alloys. For example, the reforming catalyst includes at least one of a Ni—Cu—Co—Fe—Mn—O-doped ceria composite, a Ru—Ce—Zr alloy, a Ni—Fe-ceria alloy, a nickel metal oxide alloy, Ni—$CeO_2$, Ni—$CeO_2$ (doped with Gd, Sm), Ni-PrOx, Pd—$CeO_2$, Ni—Fe—$CeO_2$, and combinations of noble metal and Ni with $CeO_2$ and/or Ce—Zr-transition metal composites. The second coating 408 has a thickness of approximately 20 μm to 50 μm, and the non-metal oxide layer has a thickness of approximately 1 μm to 10 μm. By providing the second coating 408 including a reforming catalyst on the metal plate 402, the compatibility of a solid oxide fuel cell stack including the bipolar plate 400 with various types of fuels can be improved. For example, by changing the reforming catalyst, the types of fuels used with a solid oxide fuel cell stack including the bipolar plate 400 can also advantageously be changed.

The third coating 410 is an insulating material that seals the metal plate 402. The third coating 410 preferably includes a YSZ ceramic. The third coating 410 can also contain glass to prevent fusion at low temperatures of less than 700° C. Any suitable insulating material may be used as the third coating 410, as long as the insulating material can be coated on the metal plate 402 at a temperature of less than 700° C. For example, the third coating 410 can include at least one of: silicate glass, a silicate/glass-ceramic, a Ba—Al—B—La silicate/glass-ceramic, and a Sr—Ca—B—Zn—Ti silicate glass-ceramic. The third coating 410 has a thickness of approximately 10 μm to 20 μm.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including," "having" and their derivatives. Also, the terms "part," "section," "portion," or "element" when used in the singular can have the dual meaning of a single part or a plurality of parts.

The terms of degree, such as "approximately" or "substantially" as used herein, mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:
1. A fuel cell stack comprising
   a first fuel cell including:
      a first cathode;
      a first electrolyte comprising a first solid oxide ceramic material; and
      a first anode comprising: a first metal substrate having at least one hole formed therein; and a first anode material formed on a surface of the first metal substrate and within each of the at least one hole;
   a second fuel cell including:
      a second cathode;
      a second electrolyte comprising a second solid oxide ceramic material; and
      a second anode comprising: a second metal substrate having at least one hole formed therein; and a second anode material formed on a surface of the second metal substrate and within each of the at least one hole; and a bipolar plate formed between the first anode of the first fuel cell and the second anode of the second fuel cell, the bipolar plate comprising:
- a metal plate having a first surface facing the first anode, a second surface opposite the first surface and facing the second anode, a first edge surface connecting the first surface to the second surface, and a second edge surface opposite the first edge surface and connecting the first surface to the second surface, the first and second edge surfaces being substantially perpendicular to the first surface and to the second surface;
- at least one channel formed in the first surface and the second surface;
- a first coating formed on the first surface and the second surface such that the first coating covers each of the at least one channel, the first coating also being formed on the first edge surface and the second edge surface; and
- a second coating formed on a portion of the first coating on the first edge surface and the second edge surface such that the portion of the first coating is disposed between the metal plate and the second coating, the second coating having a thickness of approximately 10 μm to 20 μm, and
- each of the at least one channel having a semi-circular shape and extending along the at least one of the first surface and the second surface.

2. The fuel cell stack according to claim 1, further comprising
- a first metal mesh formed between the bipolar plate and the first anode of the first fuel cell; and
- a second metal mesh formed between the bipolar plate and the second anode of the second fuel cell.

3. The fuel cell stack according to claim 1, wherein
the first coating covers an entirety of the at least one of the first surface and the second surface.

4. The fuel cell stack according to claim 1, wherein
the first coating is formed on an entirety of the metal plate such that the first coating covers the first surface, the second surface, the first edge surface, and the second edge surface.

5. The fuel cell stack according to claim 1, wherein
the first coating comprises manganese cobalt oxide.

6. The fuel cell stack according to claim 1, wherein
the second coating comprises a ceramic material.

7. The fuel cell stack according to claim 6, wherein
the ceramic material includes yttria stabilized zirconia, and
the second coating further comprises glass.

8. The fuel cell stack according to claim 1, wherein
the bipolar plate has a thickness of approximately 500 μm to 800 μm.

9. The fuel cell stack according to claim 1, further comprising
a third coating formed on the first surface and the second surface of the bipolar plate, the third coating including a reforming catalyst.

10. The fuel cell stack according to claim 1, further comprising
a screw that penetrates the first metal substrate of the first anode and the second metal substrate of the second anode.

11. The fuel cell stack according to claim 1, wherein
the second coating comprises at least one selected from the group consisting of: a ceramic material and a glass.

* * * * *